(12) United States Patent
Wang et al.

(10) Patent No.: US 7,125,939 B2
(45) Date of Patent: Oct. 24, 2006

(54) OLEFIN POLYMERIZATION WITH POLYMER BOUND SINGLE-SITE CATALYSTS

(75) Inventors: Shaotian Wang, Mason, OH (US); Shao-Hua Guo, Exton, PA (US)

(73) Assignee: Equistar Chemicals, LP, Houston, TX (US)

( * ) Notice: Subject to any disclaimer, the term of this patent is extended or adjusted under 35 U.S.C. 154(b) by 109 days.

(21) Appl. No.: 10/929,242

(22) Filed: Aug. 30, 2004

(65) Prior Publication Data

US 2006/0047093 A1    Mar. 2, 2006

(51) Int. Cl.
 C08F 4/02   (2006.01)
 C08F 4/647  (2006.01)
 C08F 4/76   (2006.01)
 C08F 4/52   (2006.01)

(52) U.S. Cl. .............. 526/172; 526/65; 526/142; 526/904; 526/161

(58) Field of Classification Search ........ 526/904, 526/65, 172, 142
See application file for complete search history.

(56) References Cited

U.S. PATENT DOCUMENTS

| | | | |
|---|---|---|---|
| 4,404,344 A | 9/1983 | Sinn et al. | 526/160 |
| 4,769,510 A | 9/1988 | Kaminsky et al. | 585/512 |
| 4,954,472 A * | 9/1990 | Scott et al. | 502/152 |
| 4,990,640 A | 2/1991 | Tsutsui et al. | 556/181 |
| 5,041,585 A | 8/1991 | Deavenport et al. | 556/179 |
| 5,288,677 A * | 2/1994 | Chung et al. | 502/152 |
| 5,444,141 A | 8/1995 | Guo | 526/347 |
| 5,451,652 A | 9/1995 | Guo et al. | 526/333 |
| 5,475,073 A | 12/1995 | Guo | 526/333 |
| 5,480,954 A | 1/1996 | Guo | 526/330 |
| 5,492,985 A | 2/1996 | Peifer et al. | 526/127 |
| 5,512,642 A | 4/1996 | Guo | 526/79 |
| 5,539,124 A | 7/1996 | Etherton et al. | 548/402 |
| 5,543,377 A | 8/1996 | Tsutsui et al. | 502/125 |
| 5,543,483 A * | 8/1996 | Guo | 526/330 |
| 5,605,995 A * | 2/1997 | Guo | 526/330 |
| 5,637,660 A | 6/1997 | Nagy et al. | 526/160 |
| 5,646,213 A | 7/1997 | Guo | 524/562 |
| 5,756,611 A | 5/1998 | Etherton et al. | 526/127 |
| 5,859,157 A | 1/1999 | Gupte et al. | 526/88 |
| 5,955,625 A | 9/1999 | Canich | 556/7 |
| 6,034,027 A | 3/2000 | Krishnamurti et al. | 502/200 |
| 6,127,484 A | 10/2000 | Cribbs et al. | 525/191 |
| 6,153,713 A | 11/2000 | Guo | 526/329.7 |
| 6,160,066 A | 12/2000 | Canich | 526/160 |
| 6,211,311 B1 | 4/2001 | Wang et al. | 526/131 |
| 6,340,771 B1 | 1/2002 | Hoang et al. | 556/171 |
| 6,350,831 B1 | 2/2002 | Takemori et al. | 526/160 |
| 6,455,657 B1 | 9/2002 | Guo et al. | 526/347 |
| 6,583,082 B1 * | 6/2003 | Hoang et al. | 502/109 |
| 6,710,005 B1 | 3/2004 | Guo et al. | 502/132 |
| 6,743,873 B1 * | 6/2004 | Kirk et al. | 526/204 |
| 6,887,818 B1 * | 5/2005 | Jens et al. | 502/113 |
| 6,921,799 B1 * | 7/2005 | Follestad et al. | 526/65 |
| 6,930,156 B1 * | 8/2005 | Wang et al. | 526/74 |
| 2003/0166460 A1 * | 9/2003 | Jens et al. | 502/152 |

FOREIGN PATENT DOCUMENTS

| | | |
|---|---|---|
| EP | 561476 A1 | 9/1993 |
| WO | WO 98/20045 | 5/1998 |
| WO | WO 99/50203 | 10/1999 |

* cited by examiner

*Primary Examiner*—David W. Wu
*Assistant Examiner*—Rip A. Lee
(74) *Attorney, Agent, or Firm*—Shao-Hua Guo

(57) ABSTRACT

Disclosed is a process for polymerizing olefins. The process comprises polymerizing one or more olefins with a single-site catalyst in two or more polymerization stages. The catalyst comprises a transition metal complex, an activator, and a hydroxyl functional polymer. The complex, the activator, or both are chemically bound to the hydroxyl functional polymer.

23 Claims, No Drawings

OLEFIN POLYMERIZATION WITH POLYMER BOUND SINGLE-SITE CATALYSTS

FIELD OF THE INVENTION

The invention relates to olefin polymerization with single-site catalysts. More particularly, the invention relates to olefin polymerization with polymer bound single-site catalysts.

BACKGROUND OF THE INVENTION

Single-site catalysts are generally homogeneous and soluble in olefins and most solvents. While these catalysts are most suitable for solution polymerizations, they need to be supported for use in the heterogeneous polymerization processes, including slurry and gas phase processes. Supporting single-site catalysts offer many challenges because of their high solubility. When a single-site catalyst is merely coated on or impregnated in an inorganic or polymer support, it tends to release from the support. This often causes many problems in slurry and gas phase polymerization, for example, reactor fouling, poor catalytic activity, low polymer bulk density, and poor polymer particle morphology.

To overcome the problems, many attempts have been made to chemically bond single-site catalysts to polymer supports. For instance, U.S. Pat. No. 5,492,985 teaches polystyrene bound single-site catalysts. Preparation of the polystyrene bound single-site catalysts involves a series of difficult reactions: forming chloromethylated polystyrene from polystyrene; forming methylpolystyrenecyclopentadiene by the reaction of chloromethylated polystyrene with cyclopentadienylsodium; forming lithiated methylpolystyrenecyclopentadiene by the reaction of n-butyllithium with methylpolystyrenecyclopentadiene; and then forming transition metal complex from the lithiated methylpolystyrenecyclopentadiene. This preparation is rather complex and costly.

Co-pending application Ser. No. 10/690,892 teaches polymer bound single-site catalysts which comprise a transition metal complex, an activator, and a hydroxyl functional polymer such as styrene-allyl alcohol copolymer. The complex, the activator, or both are bound to the hydroxyl functional polymer. The catalysts show high activity. We have found that the polymer bound catalysts are useful for multistage polymerization processes.

SUMMARY OF THE INVENTION

The invention is a process for polymerizing olefins. The process comprises polymerizing one or more olefins with a single-site catalyst in two or more polymerization stages. The catalyst comprises a transition metal complex, an activator, and a hydroxyl functional polymer. The complex, the activator, or both are chemically bound to the hydroxyl functional polymer.

DETAILED DESCRIPTION OF THE INVENTION

The catalyst suitable for the use in the process of the invention comprises a transition metal complex, an activator and a hydroxyl functional polymer. Preferably, the transition metal complex has the general formula:

$$(L)_m\text{-M-}(X)_n$$

M is a transition metal; L and X are ligands. The m and n are the numbers of the L and X ligands; they both are greater than or equal to 1. Preferably, M is Zr, Ti, or Hf. More preferably, M is Zr.

X is a labile ligand. "Labile ligand" means a ligand which is able to be activated by an activator to facilitate olefin polymerization. Preferably, X is independently selected from the group consisting of hydrogen, halides, $C_{1-10}$ hydrocarbyls, $C_{1-10}$ alkoxys, and $C_{6-10}$ aryloxys. The hydrocarbyl, alkoxy, and aryloxy ligands may also be substituted, for example, by halogen, alkyl, alkoxy, and aryloxy groups. More preferably, X is a halide. Most preferably, X is chloride.

Preferably, L is independently selected from the group consisting of substituted or unsubstituted cyclopentadienyls, boraaryls, pyrrolyls, azaborolinyls, quinolinyls, indenoindolyls, and phosphinimines, the like, and mixtures thereof. The L ligands provide the catalysts with "single-site" nature. That is, the catalyst has single active site for olefin polymerization and thus provides the polyolefin with relatively narrow molecular weight and composition distributions.

Two L ligands can be bridged. Groups that can be used to bridge L ligands include, for example, methylene, ethylene, 1,2-phenylene, and dialkyl silyls. Examples are —$CH_2$—, —$C(CH_3)_2$—, —$CH_2$—$CH_2$—, and —$Si(CH_3)_2$—. Bridging changes the geometry around the transition metal and can improve catalyst activity and other performance such as comonomer incorporation.

The complexes can be divided into two general categories: metallocene and non-metallocene. Metallocene complexes are transition metal complexes in which the L ligands are cyclopentadienyl (Cp) or substituted Cps such as methyl, isopropyl, and butyl Cps. Substituted Cps also include the multiple ring structures which have at least one Cp ring, such as indenyl, fluorenyl, and the like.

Non-metallocene complexes are those which contain at least one non-Cp L ligand. Preferred non-metallocene complexes include those which contain an L ligand selected from the group consisting of boraaryl, pyrrolyl, azaborolinyl, quinolinyl, indenoindolyl, and phosphinimine. These non-metallocene complexes are known. See, e.g., U.S. Pat. Nos. 6,034,027, 5,539,124, 5,756,611, 5,637,660, 6,340,771, and 6,350,831. The teachings of these patents are incorporated herein by reference.

Bridged indenoindolyl-containing transition metal complexes are particularly preferred. There are many ways to form a bridged indenoindolyl-containing transition metal complex. For example, a bridged complex can have the general structure I, II, III, or IV:

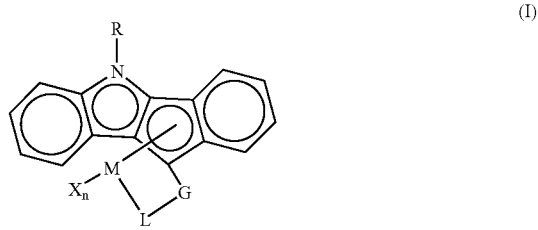

(I)

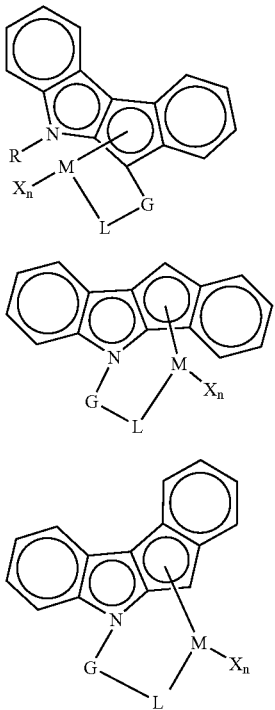

G is a bridging group. Preferably, G is selected from the group consisting of dimethylsilyl, methylene, ethylene, and isopropylidene. R is an N-substituent, which can be selected from the group consisting of alkyl, aryl, aralkyl, boryl and silyl groups. Preferred R includes methyl, phenyl, benzyl, and trimetylsilyl. The L is preferably selected from the group consisting of Cps and alkylaminos. The ring hydrogen atoms can also be independently substituted with, e.g., alkyl, aryl, aralkyl, alkylaryl, silyl, halogen, alkoxy, aryloxy, siloxy, nitro, dialkyl amino, diaryl amino, and the like.

Suitable activators include alumoxanes, alkyl aluminums, alkyl aluminum halides, anionic compounds of boron or aluminum, trialkylboron compounds, triarylboron compounds, and mixtures thereof. Examples are methyl alumoxane (MAO) and polymeric MAO (PMAO), triethylaluminum, trimethylaluminum, diethylaluminum chloride, lithium tetrakis(pentafluorophenyl)borate, triphenylcarbenium tetrakis(pentafluorophenyl)borate, N,N-dimethyl anilinium tetrakis(pentafluorophenyl)borate, lithium tetrakis (pentafluorophenyl)aluminate, tris(pentafluorophenyl)boron, tris(pentabromophenyl)boron, and the like.

Suitable hydroxyl functional polymers include those containing at least one hydroxyl group. Examples are polyether polyols, polyester polyols, and hydroxyl acrylic resins. Suitable hydroxyl functional polymers are preferably selected from allylic alcohol polymers, hydroxyalkyl acrylate polymers, or hydroxyalkyl polymers.

Suitable hydroxyalkyl acrylate and hydroxyalkyl methacrylate polymers include those which have recurring unit of hydroxyalkyl acrylate or hydroxyalkyl methacrylate. Example of hydroxyalkyl acrylate and methacrylate include hydroxyethyl acrylate, hydroxypropyl acrylate, hydroxyethyl methacrylate, and hydroxypropyl methacrylate. The hydroxyalkyl acrylate and methacrylate can be homopolymerized or copolymerized with a variety of comonomers such as vinyl aromatics, vinyl ethers and esters, alkyl acrylates and methacrylates. Preferred hydroxyalkyl acrylate or methacrylate polymers are copolymers of hydroxyalkyl acrylate or hydroxyalkyl methacrylate with styrene. These polymers are commercially available, e.g., Reactol® 100 and Reactol® 180 from Eastman Chemical Company.

Suitable allylic alcohol polymers include those which have recurring unit of an allylic alcohol. Allylic alcohols include those which have both allylic and hydroxyl groups. Preferably, the allylic alcohol is selected from the group consisting of allyl alcohol, methallyl alcohol, and alkoxylates thereof. Allyl alcohol and allyl alcohol propoxylates are commercially available from Lyondell Chemical Company.

Suitable allylic alcohol polymers include homopolymers of allylic alcohols. Examples are poly(allyl alcohol), poly (methallyl alcohol), and poly(allyl alcohol propoxylate). Methods for making these homopolymers are known. For example, U.S. Pat. No. 5,451,652, the teachings of which are incorporated herein by reference, teaches how to make homopolymers of allyl alcohol propoxylates.

Suitable allylic alcohol polymers also include copolymers of allylic alcohol with a comonomer selected from the group consisting of alkyl acrylates, alkyl methacrylates, vinyl aromatics, vinyl halides, vinyl ethers, vinyl esters, unsaturated nitriles, allyl esters, allyl ethers, allyl carbonates, and conjugated dienes, the like, and mixtures thereof. Methods for making these copolymers are known. For instance, U.S. Pat. No. 5,480,954 teaches the copolymers of allylic alcohols and allyl esters; U.S. Pat. Nos. 5,512,642, 5,444,141, and 6,455,657 teach the copolymers of allylic alcohols and vinyl aromatics; and U.S. Pat. Nos. 5,475,073, 5,646,213 and 6,153,713 teach the copolymers of allylic alcohols and alkyl acrylates and methacrylates. The teachings of these patents are herein incorporated by reference.

Copolymers are preferred. More preferred are copolymers which comprise recurring units of allylic alcohol and vinyl aromatics. Examples are styrene-allyl alcohol copolymers, styrene-methallyl alcohol copolymers, styrene-allyl alcohol alkoxylate copolymers, styrene-methallyl alcohol alkoxylate copolymers, α-alkyl styrene-allyl alcohol copolymers, α-alkyl styrene-methallyl alcohol copolymers, α-alkyl styrene-allyl alcohol alkoxylate copolymers, α-alkyl styrene-methallyl alcohol alkoxylate copolymers, p-alkyl styrene-allyl alcohol copolymers, p-alkyl styrene-methallyl alcohol copolymers, p-alkyl styrene-allyl alcohol alkoxylate copolymers, p-alkyl styrene-methallyl alcohol alkoxylate copolymers, and copolymers of allyl alcohol, styrene and alkyl acrylates or methacrylates.

Suitable hydroxyl functional polymers preferably have a number average molecular weights (Mn) within the range of about 500 to about 10,000, more preferably about 1,000 to about 5,000, hydroxyl number about 20 mg KOH/g to about 500 mg KOH/g, more preferably about 50 mg KOH/g to about 250 mg KOH/g, hydroxyl functionality (i.e., the number of hydroxyl groups per polymer chain) about 2 to 5, and glass transition temperature ($T_g$) greater than about 25° C., more preferably greater than about 50° C. Commercially available copolymers of styrene and allyl alcohol, such as SAA-100, SAA-101, and SAA-103 (products of Lyondell Chemical 10 Company) are particularly preferred. These SAA products have a hydroxyl number ranging from 125 to 255 mg KOH/g, Mw from 2,500 to 8,400, Mn from 1,200 to 3,200, and $T_g$ from 57° C. to 78° C.

Suitable hydroxyl functional polymers include those which are crosslinked. Crosslinking can be done by post-treatment of the polymer. For instance, a crosslinked polymer can be made by the reaction of the allylic alcohol polymer with a crosslinking agent. Suitable crosslinking agents include multifunctional carboxylic acids or anhydrides, isocyanates, and melamine compounds. Alternatively, a crosslinked polymer can be made by using a multifunctional monomer such as divinyl benzene or di allyl phthalate in the polymerization in which the allylic alcohol polymers are made. For instance, polymerizing allyl alcohol, styrene and divinyl benzene results in a crosslinked copolymer.

One way to make the single-site catalyst is mixing an activator with a hydroxyl functional polymer, and then mixing the mixture to a transition metal complex. Alternatively, the transition metal complex is mixed with the activator, and the mixture is then mixed with the polymer. Further, the complex can be first mixed with the polymer, and the mixture is mixed with the activator. The mixing can be performed at an ambient or elevated temperature. It can be performed in dry form or in solution. It can be performed inside or outside of the polymerization reactor.

The transition metal complex, the activator, or both are chemically bound onto the hydroxyl functional polymer. The hydroxyl group of the polymer provides an active site to react with the transition metal complex, and thus it is possible for the complex to chemically attach to the polymer chains. Similarly, activators such as alumoxanes and alkyl aluminums can react with the hydroxyl group of the polymer to form polymeric adduct. We found that the reaction of SAA copolymer with methyl alumoxane is rapid at an ambient temperature.

Preferably, the amount of activator is 1 to 5,000 times by weight of the amount of the transition metal complex. More preferably, the amount of the activator is 1 to 1,000 times of the amount of the complex. The amount of the hydroxyl functional polymer is not critical and depends on many factors including, e.g., the complex, the activator, and the hydroxyl number of the polymer used. Preferably, the amount of polymer used is about 5 wt % to about 95 wt % of the catalyst composition. More preferably, the amount of polymer is about 25 wt % to about 75 wt % of the catalyst composition.

Optionally, an inorganic oxide such as silica or polymeric support such as polyolefin or polystyrene can add to the catalyst. This is particularly desirable when the hydroxyl functional polymer is a liquid or has a low $T_g$. The added supports keep the catalyst as a solid at the polymerization temperature.

Suitable olefins for the polymerization include $C_{2-10}$ α-olefins, cyclic olefins, dienes, and mixtures thereof. Examples are ethylene, propylene, 1-butene, 1-hexene, cyclopetene, and isoprene. Preferably, the olefin is a mixture of ethylene with $C_{3-10}$ α-olefin. More preferably, the olefin is mixture of from about 85 to about 99 wt % of ethylene and from about 1 to about 15 wt % of $C_{3-10}$ α-olefin. We found that the process of the invention has great capacity to incorporate $C_{3-10}$ α-olefins into polyethylene and produce polyethylene having low or very low density.

The process of the invention comprises at least two polymerization stages. The polymerization condition in each stage can be made different by varying, e.g., the polymerization temperature, hydrogen concentration, comonomer composition, catalyst composition, or combinations of thereof. For instance, the process of the invention can comprises a first stage and a second stage. The first stage can be performed in a hydrogen concentration which is either lower or higher than that in the second stage. Higher hydrogen concentration gives a polymer having lower molecular weight. Therefore, the polyolefin produced by the process has a broad molecular weight distribution than that produced in either stage. Further, if desirable, a bimodal or multimodal polymer can be produced.

The stages can also be performed by varying the comonomer compositions. For instance, a high density polyethylene (HDPE) can be made in a first stage by polymerizing ethylene or a mixture of ethylene with a small amount of α-olefin commoner. A low or linear low density polyethylene (LDPE or LLDPE) can be made in a second stage by increasing the amount of α-olefin commoner. Hence, a desirable composition distribution of the polyethylene can be achieved.

Further, the stages can be performed at different temperatures. Increased polymerization temperature reduces the disparity in the reactivity ratios of comonomers and thus produces polymers having more even comonomer distribution. Increased temperature can reduce the polymer molecular weight and broaden the polymer molecular weight distribution. A desirable molecular weight distribution and composition distribution can be achieved.

The multiple stages can be performed in one reactor. For instance, a two-stage process can be performed in one reactor by polymerizing an olefin in a reactor in the presence of hydrogen, and removing hydrogen out of the reactor, and then continuing the polymerization in the same reactor in the absence or a reduced concentration of hydrogen. Alternatively, the stages can be performed in separate reactors. For instance, a first stage can be performed in a first reactor and a second stage can be performed in a second reactor. The polymers can be combined in the second reactor or in an additional reactor or mixer.

The polymerization is preferably conducted in gas phase or slurry phase, or a combination of them. For instance, a first stage can be performed in slurry phase and a second stage can be performed in gas phase. Slurry phase polymerization is performed in an organic solvent that can disperse the catalyst and the polyolefin. Preferred solvents include $C_4$ to $C_{10}$ linear, branched, and cyclic aliphatic hydrocarbons. Examples of suitable solvents are butane, hexane, cyclohexane, octane, heptane, isobutane, toluene, and mixtures thereof.

One advantage of the invention is that the complex, the activator, or both are chemically bound onto the hydroxyl functional polymer, and thus the catalyst is not easily dissolved in the polymerization medium. We found that the catalysts of the invention remain high activity and great capacity to incorporate higher α-olefins into polyethylene. Particularly, when the transition metal complex contains an indenoindolyl ligand, the catalyst shows an extremely high activity and the polyethylene thus made can have ultra-high molecular weight and very low density.

Another advantage is that the polymer made by the invention has improved properties compared to the polymer made by silica supported catalyst. As indicated in Example 2 and Comparative Example 3, the polyethylene made by the process of the invention has higher bulk density. Increased bulk density enhances the process efficiency of subsequent film production and the quality of the film.

The following examples merely illustrate the invention. Those skilled in the art will recognize many variations that are within the spirit of the invention and scope of the claims.

EXAMPLE 1

Preparation of Polymer Bound Single-Site Catalyst

In an inert atmosphere glove box, 1.0 g of SAA-100 (product of Lyondell Chemical, OH#: 210 mg KOH/g, Mw: 3,000, Mn: 1,500, $T_g$: 62° C.) is dissolved in 5 mL of toluene. MAO (product of Albemarle Corporation, 0.8 mL, 30 wt % in toluene) is slowly added to the SAA solution at 25° C. with agitation. The solution viscosity increases as MAO is added. The reaction continues at 25° C. for an hour after MAO addition.

Dimethylsilyl-bridged 2-methylindeno[2,1-b]indolyl cyclopentadienyl zirconium dichloride (17.1 mg) is mixed with 0.88 mL MAO (30 wt % toluene solution) to form a solution. The resulting solution is then added to the above SAA-MAO mixture at 25° C. with agitation. The mixture is stirred for 30 minutes and then dried by vacuum (about 28.5 inches mercury) at 25° C. for is about 2 hours. About 1.7 g of supported catalyst is obtained.

EXAMPLE 2

One-Stage Polymerization with Polymer Bound Single-Site Catalyst

A one-liter, stainless-steel reactor is charged with 5 mL of 1-butene. Triisobutylaluminum (TIBAL) (0.5 mL, 1.0 M solution in heptane) and Armostat 710 (fatty amine, product of Akzo Chemical, 1 mg in 0.25 ml heptane solution) are flashed into the reactor with 420 mL of isobutane by nitrogen pressure. The reactor is then pressurized with ethylene to 310 psig at 75° C. The catalyst prepared in Example 1 (60 mg) is then flashed into the reactor with about 75 mL of isobutane. The polymerization proceeds for 1.0 hour at 75° C. The reactor is vented and the polymer is collected and dried in vacuum oven at 60° C., yielding 59.1 g of polymer. The bulk density of produced resin is 0.39 gram/cm$^3$. The polymer has a weight average molecular weight (Mw): 175,400, molecular weight distribution (Mw/Mn): 3.6, short chain branching: 7.4 per thousand carbon (from FT-IR), melting point: 121.2° C. (from DSC), and density: 0.927 g/cm$^3$. The catalyst activity is 545 kg of polymer per g of metal per hour.

COMPARATIVE EXAMPLE 3

One-Stage Polymerization with Silica-Supported Single-Site Catalyst

The general procedures above are repeated by silica rather than SAA is used as a support. The bulk density of produced resin is 0.34 gram per cm$^3$. The polymer has an Mw: 207,400, Mw/Mn: 3.2, short chain branching: 4.2 per thousand carbon, melting point: 124.8° C., and density: 0.928 g/cm$^3$. The catalyst activity is 732 kg of polymer per g of metal per hour.

EXAMPLE 4

Two-Stage Polymerization with Polymer Bound Single-Site Catalyst

A one-liter, stainless-steel reactor is charged with 35 dpsi hydrogen through 10 ml hydrogen cylinder and 5 mL of 1-butene. TIBAL (0.5 mL, 1.0 M solution in heptane) and Armostat 710 (1 mg, in 0.25 ml heptane solution) are flashed into the reactor with 420 mL of isobutane by nitrogen pressure. The reactor is then pressurized with ethylene to 310 psig at 75° C. The catalyst of Example 1 (103 mg) is then flashed into the reactor with about 75 mL of isobutane. The polymerization proceeds for 15 minutes at 75° C. Then, the reactor is slowly vented to about 100 psi for partly removing hydrogen. Thereafter, the reactor pressure is pressured again with ethylene to 310 psi and the polymerization continues for 15 minutes. The reactor is then vented and the polymer is collected and dried in vacuum oven at 60° C., yielding 67.7 g of polymer. The bulk density of produced resin is 0.34 gram/cm$^3$. The polymer has an Mw: 142,500, Mw/Mn: 4.5, short chain branching: 4.8 per thousand carbon, melting point 125.1° C., and density: 0.937 g/cm$^3$. The catalyst activity is 754 kg of polymer per g of metal per hour.

COMPARATIVE EXAMPLE 5

Two-Stage Polymerization with Silica-Supported Single-Site Catalyst

The general procedures of Example 4 are repeated but a silica supported catalyst is used. The bulk density of the polyethylene produced is 0.19 gram/cm$^3$. The polymer has an Mw: 136,700, Mw/Mn: 4.4, short chain branching: 3.8 per thousand carbon, melting point: 127.6° C., and density: 0.939 g/cm$^3$. The catalyst activity is 894 kg of polymer per g of metal per hour.

We claim:

1. A process which comprises polymerizing an olefin in two or more stages with a single-site catalyst comprising a transition metal complex, an activator, and a hydroxyl functional polymer wherein the complex, the activator, or both are chemically bound to the hydroxyl functional polymer, and wherein the hydroxyl functional polymer is an allylic alcohol polymer.

2. The process of claim 1 wherein at least two stages are performed at different hydrogen concentrations.

3. The process of claim 1 wherein at least two stages are performed at different temperatures.

4. The process of claim 1 wherein at least two stages are performed at different monomer feed compositions.

5. The process of claim 1 wherein each stage is performed in a different reactor or reaction zone.

6. The process of claim 1 wherein each stage produces a polyolefin having a different density.

7. The process of claim 1 wherein each stage produces a polyolefin having a different average molecular weight.

8. The process of claim 1 wherein each stage produces a polyolefin having a different composition.

9. The process of claim 1 wherein the hydroxyl functional polymer is a styrene-allyl alcohol copolymer.

10. The process of claim 1 wherein the transition metal complex has the general structure:

$(L)_m\text{-M-}(X)_n$ wherein M is a transition metal; X is independently selected from the group consisting of hydrogen, halides, $C_{1-10}$ hydrocarbyls, $C_{1-10}$ alkoxys, and $C_{6-10}$ aryloxys; L is independently selected from the group consisting of substituted or unsubstituted cyclopentadienyls, boraaryls, pyrrolyls, azaborolinyls, quinolinyls, indenoindolyls, and phosphinimines; m≧1; n≧1; and optionally two L ligands are bridged.

11. The process of claim 1 wherein the activator is selected from the group consisting of alumoxanes, alkyl aluminums, alkyl aluminum halides, anionic compounds of boron or aluminum, trialkylboron compounds, triarylboron compounds, and mixtures thereof.

12. The process of claim 1 wherein the transition metal complex has at least one indenoindolyl ligand.

13. The process of claim 1 wherein the olefin is selected from the group consisting of ethylene, propylene, 1-butene, 1-pentene, 1-hexene, 1-octene, and mixtures thereof.

14. The process of claim 1 wherein the olefin is selected from ethylene, 1-butene, or mixtures thereof.

15. A multimodal polyolefin made by the process of claim 1 which has a bulk density greater than 0.3 g/cm$^3$.

16. A process which comprises polymerizing an olefin in two or more stages with a single-site catalyst comprising a transition metal complex, an activator, and a hydroxyl functional polymer wherein the complex, the activator, or both are chemically bound to the hydroxyl functional polymer, and wherein the transition metal complex has at least one indenoindolyl ligand.

17. The process of claim 16 wherein at least two stages are performed at different hydrogen concentrations.

18. The, process of claim 16 wherein at least two stages are performed at different temperatures.

19. The process of claim 16 wherein at least two stages are performed at different monomer feed compositions.

20. The process of claim 16 wherein each stage is performed in a different reactor or reaction zone.

21. The process of claim 16 wherein each stage produces a polyolefin having a different density.

22. The process of claim 16 wherein each stage produces a polyolefin having a different average molecular weight.

23. The process of claim 16 wherein each stage produces a polyolefin having a different composition.

* * * * *